(12) United States Patent
Cohen et al.

(10) Patent No.: US 7,013,483 B2
(45) Date of Patent: Mar. 14, 2006

(54) METHOD FOR EMULATING AN EXECUTABLE CODE IN ORDER TO DETECT MALICIOUSNESS

(75) Inventors: Oded Cohen, Tivon (IL); Inbal Meir, Haifa (IL); Yanki Margalit, Ramat-Gan (IL); Dany Margalit, Ramat-Gan (IL)

(73) Assignee: Aladdin Knowledge Systems Ltd., Tel Aviv (IL)

( * ) Notice: Subject to any disclaimer, the term of this patent is extended or adjusted under 35 U.S.C. 154(b) by 286 days.

(21) Appl. No.: 10/335,871

(22) Filed: Jan. 3, 2003

(65) Prior Publication Data

US 2004/0133796 A1 Jul. 8, 2004

(51) Int. Cl.
*H04L 713/20* (2006.01)

(52) U.S. Cl. .............................. 726/25; 726/23; 726/24; 713/165; 713/167; 713/188

(58) Field of Classification Search ................. 713/188, 713/200–201, 167, 165; 380/4, 3
See application file for complete search history.

(56) References Cited

U.S. PATENT DOCUMENTS

| | | | | |
|---|---|---|---|---|
| 5,398,196 A | * | 3/1995 | Chambers | 714/28 |
| 5,842,002 A | * | 11/1998 | Schnurer et al. | 703/21 |
| 5,978,917 A | * | 11/1999 | Chi | 713/201 |
| 6,035,423 A | | 3/2000 | Hodges et al. | |
| 6,067,410 A | * | 5/2000 | Nachenberg | 703/28 |
| 6,269,456 B1 | | 7/2001 | Hodges et al. | |
| 6,357,008 B1 | * | 3/2002 | Nachenberg | 713/200 |
| 2002/0013910 A1 | | 1/2002 | Edery et al. | |
| 2002/0073330 A1 | | 6/2002 | Chandnani et al. | |

FOREIGN PATENT DOCUMENTS

| | | |
|---|---|---|
| WO | WO01/88673 | 11/2001 |
| WO | WO02/37740 | 5/2002 |

OTHER PUBLICATIONS http://livedocs.macromedia.com/colfusion/6/Developing_coldFusion_MX_Applications_with_CFML/queryDB6.htm.*
Pleszkoch et al., "Improving Network System with Function Extraction Technology for Automated Calculation of Program Behavior", Proceeding of the 37th Hawaii International Conference on System Science, 2004.*
http://www.cgisecurity.com/owasp/html/ch11s04.*

* cited by examiner

*Primary Examiner*—Gregory Morse
*Assistant Examiner*—Tongoc Tran
(74) *Attorney, Agent, or Firm*—Mark M. Friedman

(57) ABSTRACT

The present invention is directed to a method for emulating an executable code, whether it is a human-readable code (e.g., macro and script) or a compiled code (e.g. Windows executable). At the design time, one or more content attributes are defined for the variables of the code. A content attribute indicates a property with relevance to maliciousness, e.g. Windows directory, a random value, ".EXE" at the right of a string, etc. A content attribute may be implemented, for example, by a flag. Also defined at the design time, is a list of malicious states, where a malicious state comprises at least the combination of a call to a certain system function with certain content, as the calling parameter(s). When emulating an assignment instruction, the attributes of the assigned variable are set according to the assigned content. When emulating a mathematical operator, a content mathematics is also applied. When emulating a function call, the current state (i.e. the function identity and the calling content and values) is compared with the predefined malicious states, and if at least one malicious state corresponds, then the maliciousness of the code is determined.

24 Claims, 1 Drawing Sheet

METHOD FOR EMULATING AN EXECUTABLE CODE IN ORDER TO DETECT MALICIOUSNESS

FIELD OF THE INVENTION

The present invention relates to the field of detecting presence of virus and other kinds of malicious code by emulation.

BACKGROUND OF THE INVENTION

Emulation is one of the methods of detecting viral activity. The emulator creates a virtual environment under which the code of the tested sample is examined instruction-by-instruction. The viral activity is detected by correlating the changes with a viral behavior.

Emulation has several advantages in comparison to other methods of detecting and/or preventing viral damages, since it helps to detect polymorphic viruses, encrypted viruses and unknown viruses, which cannot be detected by other methods.

A programmer can indicate the maliciousness of a source code just by reviewing the code. For example, if he identifies a loop that gets the name of the files of a directory and deletes them, he can assume that the code is malicious. Contrary to a human programmer, an emulator, which is a machine, cannot indicate viral code just by reviewing the code, but it has to execute the code while comparing the caused changes with known patterns. In other words, the emulator, being a machine, is absent of human intelligence.

It is an object of the present invention to provide a method for emulating an executable code in order to detect maliciousness, which is more "intelligent" than known in the prior art.

Other objects and advantages of the invention will become apparent as the description proceeds.

SUMMARY OF THE INVENTION

The present invention is directed to a method for emulating an executable code, whether it is a human-readable code (e.g., macro and script) or a compiled code (e.g. Windows executable). At the design time, one or more content attributes are defined for the variables of the code. A content attribute indicates a property with relevance to maliciousness, e.g. Windows directory, a random value, ".EXE" at the right of a string, etc. A content attribute may be implemented, for example, by a flag. Also defined at the design time, is a list of malicious states, where a malicious state comprises at least the combination of a call to a certain system function with certain content, as the calling parameter(s). When emulating an assignment instruction, the attributes of the assigned variable are set according to the assigned content. When emulating a mathematical operator, a content mathematics is also applied. When emulating a function call, the current state (i.e. the function identity and the calling content and values) is compared with the pre-defined malicious states, and if at least one malicious state corresponds, then the maliciousness of the code is determined.

The system function can be, for example, a part of the programming language of the executable, a function provided by the operating system under which the code is to be executed, a function provided by a linked package of routines.

BRIEF DESCRIPTION OF THE DRAWINGS

The present invention may be better understood in conjunction with the following figure.

DETAILED DESCRIPTION OF PREFERRED EMBODIMENTS

Figure 1:
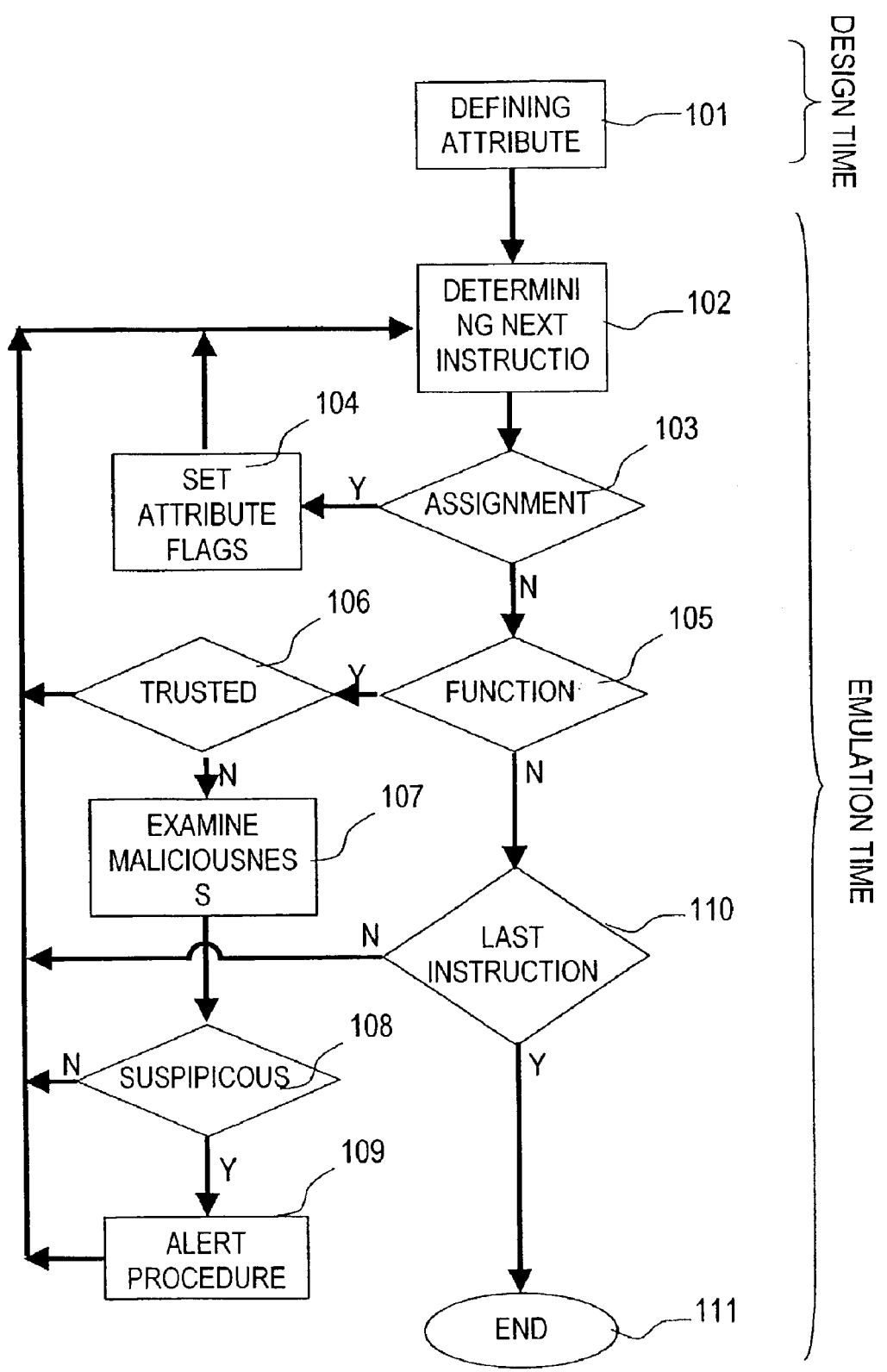
FIG. 1 schematically illustrates a method for emulating an executable, in order to detect malicious code.

The term Macro in conjunction with computers, refers herein to an executable code embedded within another entity, like a document or executable code.

The term Script in conjunction with computers, refers in the art to a program built into the HTML code of a Web page that work on almost all Internet applications. Scripts can also be used with a variety of applications that support their scripting syntax. VBScript and JavaScript are examples of scripting languages.

Macros and scripts are "non-compiled executables", i.e. programs wherein their executable code is the source code, contrary to "compiled executables" which are converted to machine-code before execution. ASP and XML are other examples of non-compiled executables.

Due to their human readability, non-compiled executables are exploited by vandals (malicious executables written into scripts and macros). They can do almost anything—infect a system with Trojans, modify files, cause DoS attacks, or spread malicious code using Microsoft Networks or Microsoft Outlook. Macro-viruses that attack Microsoft Word work by copying themselves into the global environment—usually by modifying NORMAL.DOT. Unfortunately, the enhanced power of software applications also gives virus writers the potential to cause more damage.

It should be noted that the examples herein are presented in a human-readable programming code, although they apply to both compiled and non-compiled code. Moreover, the examples are presented in a schematic programming language, rather than an existing programming language.

There are some programming tools and computer resources commonly used by malicious code. For example, the random generator, which is a programming tool provided by almost any operating system and almost any programming language, is commonly used by viruses to prevent the repetition of the same code when duplicating itself, thereby hardening the detection of the malicious code by bit-pattern (also known as "virus signature") scanning. A human-readable code, as a program written in a programming language, makes use of variables. Since it is plain text, the mechanism that duplicates the malicious code can generate random names for its variables, to add non-effective code comments between its effective code lines, etc. The non-effective code may also be generated randomly, thus using the random generator.

The real time clock, which is a programming-tool provided by any operating system and almost any programming language, is another example of a virus-commonly used programming tool, since it enables a late-trigger of the virus code, and also because it can be used as a substitute to the random generator. Moreover, some of the viruses have a late trigger, thereby enabling them to be widely propagated before causing the damage, and consequently their discovery. The late trigger is tuned to a future date, which involves use of the real time clock of the host machine.

Another example of a content used by malicious code in Windows operating system is the Windows folder, which stores Windows system files. A virus may try to change one of the existing files in the Windows folder, create a file with a random name, etc.

A combination of some of the contents described above may also indicate the presence of malicious code within an executable. For example, creating a new file having a random name in the Windows directory can be due to a virus. However, a more accurate indication of a malicious code can be obtained if this is an executable file. Thus, if the created file has an EXE extension, which is the extension of Windows executables, or VBS, which is the extension of Visual Basic Script, the executable can be classified as malicious.

According to a preferred embodiment of the present invention, a "malicious state" comprises at least executing a certain system function with certain content as its parameter (s). Thus, at least two elements are involved—a certain system function and certain content as the parameter(s).

It should be noted that the term "content" of a variable refers herein also to its value. Nevertheless, in some cases the value has been also mentioned.

A state can be indicated as malicious if it corresponds to at least one pre-defined malicious state. Two states "correspond" if their elements (i.e. function identity and the calling content) are equal or at least "similar (e.g., at least certain percentage of their content/value is equal). Maliciousness can be defined also by tracking the history of the called functions, e.g., if certain functions have been called with certain content, or even without regard-ness to their content.

Identifying a call to a certain function is quite obvious, and almost any compiler parser performs it. However, the concept of dealing with the content of a parameter rather than its value is novel.

For example, the parameter when calling the following function is a random number:

MyVariable=Random( )

MyVariable=MyVariable+1

Call MyFunction(My_Variable)

Where Random( ) is a random number generator.

The first time MyFunction is performed, its parameter may be, e.g., 0.443213, and the next time it can be, e.g., 0.332455. Thus, from analyzing the text it is not possible to indicate that the parameter has a random nature.

According to a preferred embodiment of the invention, the content of a variable can be indicated as follows:

Each variable of the executable is characterized by several attributes (e.g. flags), which points out on its content (referred herein as content attributes). For example:
- a flag to indicate if the variable has been assigned with the Windows folder name;
- a flag to indicate if the variable has been assigned with a random value;
- a flag to indicate if the variable has been assigned with the real time;
- a flag to indicate if the variable has been assigned with the value ".EXE", which is the extension of a type of executable file under the Windows operating system;

and so forth.

While emulating the execution of an executable, the following instructions (for example) are performed:

File_name=Windows_directory( )+Random( )+0.2+".EXE"

Create_file(File_name)

Where: Windows_directory( ) is a system function that returns a string of the Windows directory, and Random returns a numeric random integer.

In this example, the Windows folder flag, the Random flag and the EXE flag of the variable File_name are turned on.

It should be noted that

File_name=Windows_directory( )+Random( )+0.2+".EXE"

actually comprises several instructions:
- Executing the Random function;
- Executing the Windows_directory function;
- Mathematical addition;
- String addition.

It should also be noted that while some programming languages convert a numeric value to a string value and vice versa when it is required, some compilers have no such ability. Thus, assuming the function Str converts a numeric value to a string, in this case the example should look like:

File_name=Windows_directory( )+Str(Random( )+0.2)+".EXE"

There is no point in considering assigning a value to variables as malicious operation; however without tracking the history of the assignments to a variable, its content cannot be determined. Thus, the examining stage should be at the point where specific system functions which may cause damage to the computer are called, e.g. a function that creates a file, a function that changes the content of a file, and so forth.

The following instruction also creates an executable file with a random name in the Windows directory:

Create_file(Windows_directory( )+Random( )+".EXE")

However, instead of using a variable as the parameter of the function Create_file, the name of the file is the parameter. Actually, this is equivalent to creating a temporary variable, and assigning a value to the temporary variable just before the execution of said function:

Temp_parameter=Windows_directory( )+Random( )+".EXE"

Call Create_file(Temp_parameter)

As mentioned above, according to the present invention, the variables comprise content attributes in addition to the value. Thus, there is a question as to how the content is influenced by mathematical operations. For example:

MyValue=123+First_var+Second_var

Where, for example, the Real time flag of the variable First_var is turned on and the EXE flag of the variable Second_var is turned on. It is obvious that in this case the content result of the assignment is turning on the Real time flag and the EXE flag of the variable MyValue. Thus, the emulator should be provided with "content mathematics" rules. Such rules, which for example comprise a commutative law of addition, an associative law of addition and so forth, should also take into consideration comparison statements and other features supported by the emulated programming language. Of course it is desired to emulate the values as well, in addition to emulating the content.

Another example:

Var_A=GetAddressBook( )

Var_B=Var_A->Count( )

Where Var_A has the content type "address book object". When the operator "->Count( )" is operated on an "address book object", it returns not just a numeric value, but a numeric value with the content attribute "number of entries in address book", thus adding the "number of entries in address book" to the variable Var__B.

Another example:

Var__A=GetAddressBook( )

Var__C=Var__A[2]

After the assignment to Var__C, its value will be the second entry of the address book which has been assigned to Var__A. The content attributes of Var__A may be something like "address book database", and the content attribute of Var__C may be something like "address book entry".

FIG. 1 schematically illustrates a method for emulating an executable, in order to detect malicious code.

At step 101, which is the design step, a group of malicious states is defined. A malicious state is the combination of a call to a certain system function with certain content. This is a preliminary stage, which is performed at the anti-virus firm, as a part of the anti-virus emulator design. Of course the list of the content attributes and/or functions can reside on a file, and modified later (whether at the anti-virus firm residence or at the installation site).

At the next step 102, which is performed at the emulation time (i.e. run time), the next instruction to be performed is determined.

At the next step 103, the type of the instruction is examined. If it is an assignment instruction, then the flow continues with step 104, otherwise the flow continues with step 105.

At step 104, the instruction is analyzed in order to determine the content attribute(s) of the assigned variable to be set, and the corresponding values are set, and from there, the flow returns to step 102.

At step 105, if the type of the instruction is a function call, then the flow continues with step 106; otherwise the flow continues with step 110.

From step 106, if the function is pre-determined as trusted, then the flow continues to step 102; otherwise flow continues to step 107.

At step 107 the maliciousness is examined by comparing the current state (i.e. the calling function with the content attributes of the parameters) with the malicious states that have been pre-defined in step 101. Determining the maliciousness of a code can be indicated if the current state corresponds to at least one of the pre-defined malicious states.

From step 108, if the instruction seems to be suspicious according to the examination carried out at step 107, then the flow continues with step 109, where an alert procedure is performed, and from there to step 102.

From step 110, if the last tested instruction is the last instruction (e.g. a Stop instruction), then the emulation stops, otherwise the flow continues with step 102.

Usually, the emulation continues until the last instruction is performed, and then the results of the emulation are examined. This way, more details are gathered and the maliciousness of the code can be determined more precisely. However, the alert procedure can suspend further execution, thereby shortening the emulation time.

As known to a person of ordinary skill in the art, a function can be declared such that a parameter is transferred by its address or by its value. In case of transferring a value, a temporary parameter is created and its address is transferred as a parameter, like in the other case. In both cases when emulating the code, the variables, whether permanent or temporary, also comprise the content attributes.

It should be noted that the term "function" also refers herein to procedures, software interrupts and so forth.

The emulation can be executed at the user's machine, at the gateway to a network and so forth. For example, while a user may install an emulator to check every incoming HTML file while browsing the Internet/Intranet, an organization may install such an emulator at the gateway to its network, at the mail server and so forth.

Those skilled in the art will appreciate that the invention can be embodied by other forms and ways, without losing the scope of the invention. The embodiments described herein should be considered as illustrative and not restrictive.

What is claimed is:

1. A method for emulating an executable code, said method comprising:
    pre-defining at least one content attribute having relevance to maliciousness, for at least one variable of said executable code;
    pre-defining at least one malicious state, being a call to a certain system function with certain content and/or value;
    upon emulating an assignment instruction, setting the content attributes of the assigned variable according to the assigned content, and the value of the assigned variable;
    upon emulating a mathematical operator, employing content mathematics; and upon emulating a function call, checking that the current state, being the combination of the function identity with the content and/or value of the calling parameters, corresponds to at least one of the pre-defined malicious states, thereby indicating the maliciousness of said code.

2. The method according to claim 1, wherein said at least one content attribute is selected from a group comprising: a programming flag, a Boolean value, a numeric value, and a string value.

3. The method according to claim 1, wherein said executable includes compiled code.

4. The method according to claim 1, wherein said executable includes human-readable code.

5. The method according to claim 3, wherein said compiled code is selected from the group consisting of Windows EXE, Windows DLL, Windows OCX, Linux executables, Solaris executables.

6. The method according to claim 4, wherein said human-readable code is selected from the group consisting of macro, script, VBScript, JavaScript, BAT, PHP, and ASP.

7. The method according to claim 1, wherein at least one said checking includes testing an equality of at least one element selected from the group consisting of an identity of said function said content of said calling parameters, and said value of said calling parameters.

8. The method according to claim 1, wherein at least one said checking includes testing a similarity of at least one element selected from the group consisting of an identity of said function, said content of said calling parameters, and said value of said calling parameters.

9. The method according to claim 1, wherein at least one said checking includes testing if certain functions have already been called, testing if certain functions have been already called with certain parameters.

10. The method according to claim 1 wherein said system function is a random value.

11. The method according to claim 1 wherein said system function is a tine value.

12. The method according to claim 1 wherein said system function is a certain folder name.

13. The method according to claim 1 wherein said system function is a number of files in a folder.

14. The method according to claim 1 wherein said system function is a certain folder extension.

15. The method according to claim 1, wherein said system function is a function written in a programming language of the executable.

16. The method according to claim 1, wherein said system function is an operating system function of an operating system under which said code is to be executed.

17. The method according to claim 1, wherein at least one said parameter is a permanent parameter.

18. The method according to claim 1, wherein at least one said parameter is a temporary parameter.

19. The method according to claim 1, wherein at least one said parameter is passed by its content.

20. The method according to claim 1, wherein at least one said parameter is passed by its address.

21. A method for emulating, said method comprising:

providing non-compiled code;

pre-defining at least one content attribute having relevance to maliciousness, for at least one variable of said executable code;

pre-defining at least one malicious state, at least one said malicious state being a call to a certain system function with at least one said content attribute;

upon emulating an assignment instruction within said non-compiled code, setting the content attributes of the assigned variable according to the assigned content, and the value of the assigned variable;

upon emulating a mathematical operator within said non-compiled code, employing content mathematics; and upon emulating a function call within said non-compiled code, checking that the current state, being the combination of the function identity with the content and/or value of the calling parameters, corresponds to at least one of the pre-defined malicious states, thereby indicating the maliciousness of said code.

22. A method for emulating, said method comprising:

providing non-compiled executable code;

pre-defining at least one content attribute having relevance to maliciousness, for at least one variable of said executable code;

pre-defining at least one malicious state, being a call to a certain system function with certain content and/or value;

upon emulating an assignment instruction within said non-compiled executable code, setting the content attributes of the assigned variable according to the assigned content, and the value of the assigned variable;

upon emulating a mathematical operator within said non-compiled executable code, employing content mathematics; and upon emulating a function call within said non-compiled executable code, checking that the current state, being the combination of the function identity with the content and/or value of the calling parameters, corresponds to at least one of the pre-defined malicious states, thereby indicating the maliciousness of said code.

23. A method for emulating, said method comprising:

pre-defining at least one content attribute having relevance to maliciousness, for at least one variable of said executable code;

pre-defining at least one malicious state, said at least one said malicious state being a call to a certain system function with a variable having a certain content attribute;

upon emulating an assignment instruction, setting the content attributes of the assigned variable according to the assigned content, and the value of the assigned variable;

upon emulating a mathematical operator, employing content mathematics; and upon emulating a function call, checking that a first current state, being the combination of the function identity with the content attributes of the calling parameters, corresponds to at least one of the pre-defined malicious states, thereby indicating the maliciousness of said code.

24. The method of claim 23 wherein upon emulating a function call a second current state being the combination of the function identity with the content and/or value of the calling parameters is checked.

* * * * *